J. LOMAS.
APPARATUS FOR GRADING APPLES AND SUCH LIKE FRUIT.
APPLICATION FILED DEC. 26, 1908.

944,887.

Patented Dec. 28, 1909.
2 SHEETS—SHEET 1.

WITNESSES
W. P. Burk
Orm. G. Smith

INVENTOR
Joseph Lomas
BY
ATTY

J. LOMAS.
APPARATUS FOR GRADING APPLES AND SUCH LIKE FRUIT.
APPLICATION FILED DEC. 26, 1908.

944,887.

Patented Dec. 28, 1909.
2 SHEETS—SHEET 2.

WITNESSES
W. P. Burke
Chas. G. Smith

INVENTOR
Joseph Lomas
BY
[signature]
ATTY.

UNITED STATES PATENT OFFICE.

JOSEPH LOMAS, OF SOUTHBRIDGE, TASMANIA, AUSTRALIA.

APPARATUS FOR GRADING APPLES AND SUCH LIKE FRUIT.

944,887.  Specification of Letters Patent.  Patented Dec. 28, 1909.

Application filed December 26, 1908. Serial No. 469,351.

*To all whom it may concern:*

Be it known that I, JOSEPH LOMAS, of Southbridge, Tasmania, Commonwealth of Australia, a subject of the King of Great Britain, orchardist, have invented certain new and useful Improvements in Apparatus for Grading Apples and Such Like Fruit, of which the following is a specification.

My invention has been devised for the purpose of grading apples and other spherical fruits such as apricots, oranges and the like in a machine, so constructed, that it will easily and safely handle the fruit. Further, the working parts are so disposed that they are readily interchangeable for the purpose of adapting the machine to grade fruits of widely varying sizes.

Figure 1:
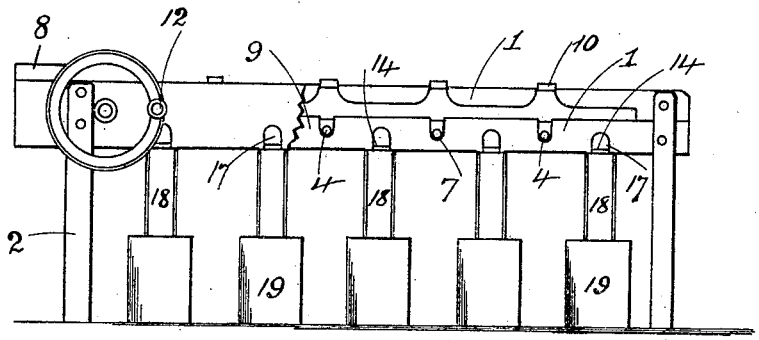
Figure 2:
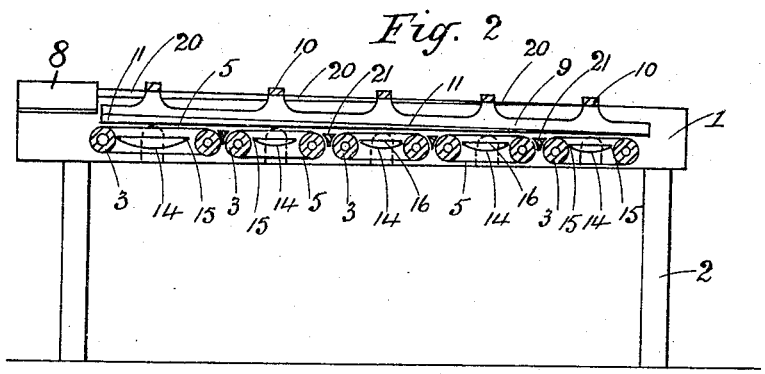
Figure 3:
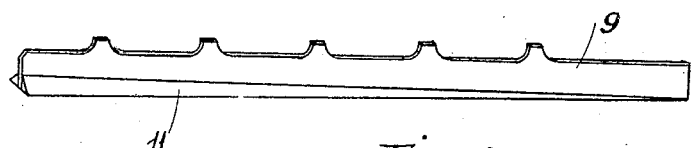
Figure 4:
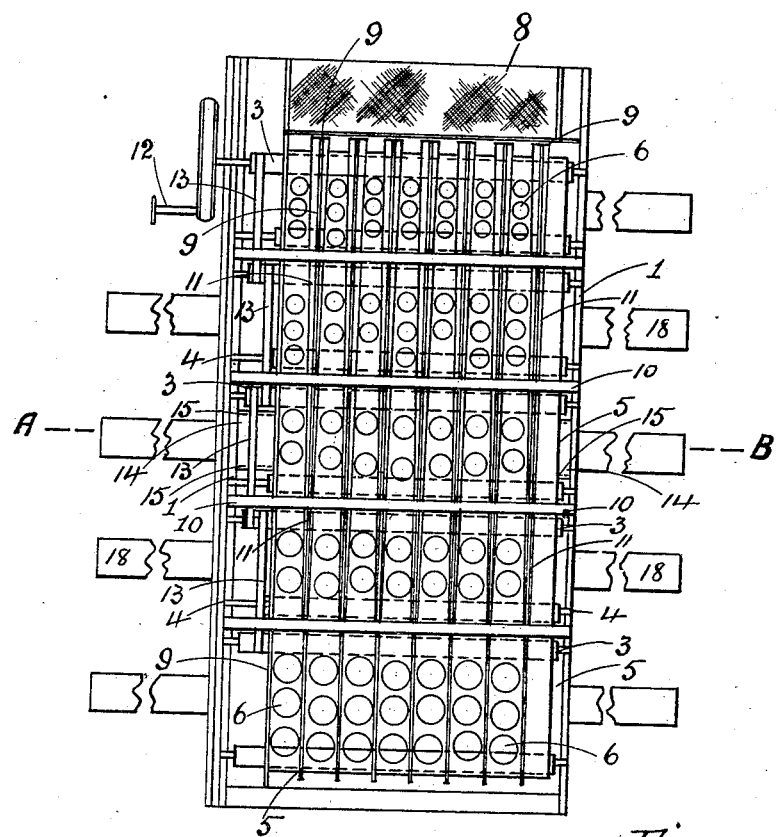
Figure 5:
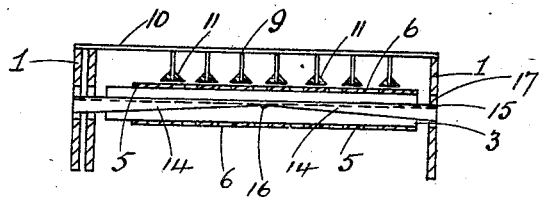

My invention is shown illustrated in the accompanying drawings, in which,

Figure 1 is a side elevation partly in section. Fig. 2 is a longitudinal sectional elevation of the machine. Fig. 3 shows one of the partitions with attached fillets. Fig. 4 is a plan of the machine, and Fig. 5 is a sectional elevation on the line A—B, Fig. 4.

The frame 1 is supported on legs 2 which are of sufficient length to allow of a gentle slope sideways from the machine, of chutes hereafter to be described, that conduct the graded fruit to cases or other receptacles for holding it.

Mounted transversely in the frame are a number of rollers 3 mounted on spindles 4. Each pair of rollers carries an endless belt 5 in which are perforations 6. The spindles are mounted in U shaped bearings 7 which permit of each belt or screen being lifted out of position bodily for purpose of interchange.

At the head of the machine is a tray 8 that is baize covered and is intended for the reception of a supply of mixed fruit, say of apples.

Running longitudinally in the machine from the tray 8 are a number of parallel partitions 9 which are shaped as shown in the drawings with hummocks or elevations to which crosspieces 10 are screwed. These crosspieces run transversely in the machine and rest lightly upon the top of the machine frame, and thereby support the partitions which together constitute a plurality of lanes or races running the length of the appliance. Attached to the foot of each partition 9 are fillets 11 that are broadest at the head and gradually diminish as the foot of the machine is approached.

The perforations 6 in the belts 5 are arranged longitudinally in the races or lanes, the smaller set being at the head of the machine. The perforations in each succeeding band are slightly larger than those in the preceding one until at the foot end of the apparatus the holes are largest. The system of bands 5 is driven by means of a handle 12 mounted on the spindle of the end roller. Belts 13 convey the motion from the driving roller to the other rollers in the system. The bands are so arranged in relation to the partitions that there is a brushing contact between the one and the other as the bands are moved, for the purpose hereafter to be explained.

When a mixed supply of say, apples, is passed from the tray 8 to the races, each apple will be supported at first by the fillets 11. The holes 6 are of such a diameter as to approximately correspond with the distance between the edges of the fillets at any section in the machine. As the bands move they will brush against the apple as it lies in the race and will thus cause it to move in the same direction as the band. When it has moved well into the race, if it is a small apple it will immediately arrive at a point where the space between its supports is greater than its diameter. At this point the weight of the apple will be taken by the band and it will fall through one of the perforations therein. In order to safely receive it and to conduct it from the machine I provide canvas or other conductors 14. These may be simply constructed of two parallel wires 15 secured transversely in the machine and connected at their middle parts by a short cross wire 16. This latter wire comes under the canvas and holds it up at the middle thereby providing, with the parallel wires, a trough sloping gently each way from the middle of the machine. The apple will fall into the conductor and will roll to the edge of the machine where it will pass through an opening 17. From the opening it will pass on to the inclined chute 18 down which it will roll into the case or receptacle 19.

While I prefer to employ the system of perforated bands for the purpose of keeping the apples on the move, it is not absolutely necessary, as if the machine is slightly inclined it will be found that the fruit, particularly the heavier sorts, will readily gravitate along the races and will fall through at the proper places on to their particular conductors.

In Fig. 2 I have shown the system of longitudinal races inclining from the head of the machine. To insure such being so I utilize a pair of boards 20, constituting inclined planes, on which the crosspieces 10, which support the races will rest. With this arrangement it is not necessary to use the moving bands 5 and the fruit will gravitate along the races until each piece falls through at the proper place into its conductor 14. In this arrangement it will be noticed that the races will be inclined at the same time that the other parts in the machine remain in a horizontal position.

The rollers 3 are recessed to receive the driving belts 13. This arrangement will permit of the rollers being brought closer together between one band and another. But in case the interval between one band and the next be too great, small V shaped pieces 21, shown in section in Fig. 2, are placed between the bands. These insure that the fruit may, if necessary, pass from one band to the next. The pieces 21 may be attached to the partitions 9.

While I have designed the machine for the grading of apples, it may also be used for grading other spherical fruit. The system of races, being suspended in the machine can be easily removed and another system put in its place according to the fruit to be treated. The endless bands with the rollers can also be quickly lifted out and other bands with different perforations laced together and placed on the rollers, which are easily dropped into their bearings 7.

Having now described my invention what I claim as new and desire to secure by Letters Patent is:—

1. An apparatus for grading apples, comprising a tray at the upper end of the apparatus, a series of parallel partitions extending from the inner end of the tray to the other end of the apparatus, said partitions having diminishing fillets at the lower edges, a system of perforated endless bands in brushing contact with the base of the fillets, the perforations corresponding in size with the spaces between the fillets, and canvas conductors arranged below the fillets and inclining toward each side of the apparatus, substantially as described.

2. The combination of a plurality of parallel longitudinal races each being open in its base which opening increases gradually in width from head to the foot of the machine, a system of perforated endless bands in brushing contact with the base of the races the perforations corresponding in size with the opening in the races, and conductors within the bands for conducting the fruit from the machine, as herein specified.

3. An apparatus for grading apples comprising a frame having upright side walls, a plurality of longitudinal parallel partitions having diminishing fillets attached to the lower edges and raised portions at intervals along the upper edges, transverse bars secured to said raised portions and adapted to rest on the upright walls of the frame so as to support the partitions and a system of perforated endless bands in brushing contact with the base of the partitions, the perforations corresponding in size with the spaces between the fillets.

In witness whereof I have hereunto signed my name in the presence of two subscribing witnesses.

JOSEPH LOMAS

Witnesses:
H. C. TAPPING,
CHAS. L. C. HILLER.